US011210207B2

(12) United States Patent
Bennett et al.

(10) Patent No.: US 11,210,207 B2
(45) Date of Patent: *Dec. 28, 2021

(54) PERFORMANCE COUNTERS FOR COMPUTER MEMORY

(71) Applicant: Microsoft Technology Licensing, LLC, Redmond, WA (US)

(72) Inventors: John G. Bennett, Clyde Hill, WA (US); Siamak Tavallaei, Spring, TX (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 117 days.

This patent is subject to a terminal disclaimer.

(21) Appl. No.: 16/684,129

(22) Filed: Nov. 14, 2019

(65) Prior Publication Data

US 2020/0081826 A1   Mar. 12, 2020

Related U.S. Application Data

(63) Continuation of application No. 15/984,219, filed on May 18, 2018, now Pat. No. 10,509,721.

(Continued)

(51) Int. Cl.
*G06F 12/00* (2006.01)
*G06F 12/02* (2006.01)
(Continued)

(52) U.S. Cl.
CPC ............ *G06F 12/023* (2013.01); *G06F 3/061* (2013.01); *G06F 3/068* (2013.01); *G06F 3/0611* (2013.01);
(Continued)

(58) Field of Classification Search
None
See application file for complete search history.

(56) References Cited

U.S. PATENT DOCUMENTS 10,509,721 B2 * 12/2019 Bennett ............... G06F 12/023
2010/0306464 A1   12/2010 Dawkins
(Continued)

FOREIGN PATENT DOCUMENTS

WO   2016065010 A1   4/2016
WO   2016170631 A1   10/2016

OTHER PUBLICATIONS

"International Search Report and Written Opinion Issued in PCT Application No. PCT/US18/058818", dated Nov. 21, 2019, 19 Pages.

*Primary Examiner* — Daniel D Tsui
(74) *Attorney, Agent, or Firm* — Mannava & Kang, P.C.

(57) ABSTRACT

In some examples, performance counters for computer memory may include ascertaining a request associated with a memory address range of computer memory. The memory address range may be assigned to a specified performance tier of a plurality of specified performance tiers. A performance value associated with a performance attribute of the memory address range may be ascertained, and based on the ascertained performance value, a weight value may be determined. Based on the ascertained request and the determined weight value, a count value associated with a counter associated with the memory address range may be incremented. Based on an analysis of the count value associated with the counter, a determination may be made as to whether the memory address range is to be assigned to a different specified performance tier of the plurality of specified performance tiers. Based on a determination that the memory address range is to be assigned to the different specified performance tier, the memory address range may be assigned to the specified different performance tier.

20 Claims, 6 Drawing Sheets

Related U.S. Application Data

(60) Provisional application No. 62/583,909, filed on Nov. 9, 2017.

(51) Int. Cl.
*G06F 3/06* (2006.01)
*G06F 12/128* (2016.01)
*G06F 12/08* (2016.01)
G06F 11/34 (2006.01)
G06F 11/30 (2006.01)

(52) U.S. Cl.
CPC .......... *G06F 3/0647* (2013.01); *G06F 3/0649* (2013.01); *G06F 3/0673* (2013.01); *G06F 12/08* (2013.01); *G06F 12/128* (2013.01); *G06F 11/3034* (2013.01); *G06F 11/3037* (2013.01); *G06F 11/3466* (2013.01); *G06F 2201/88* (2013.01); *G06F 2212/1016* (2013.01)

(56) References Cited

U.S. PATENT DOCUMENTS

| | | |
|---|---|---|
| 2013/0013850 A1 | 1/2013 | Baderdinni |
| 2013/0132638 A1 | 5/2013 | Horn et al. |
| 2014/0025916 A1 | 1/2014 | Oshima et al. |

* cited by examiner

400

ASCERTAIN A REQUEST ASSOCIATED WITH A MEMORY ADDRESS
RANGE OF COMPUTER MEMORY
402

INCREMENT, BASED ON THE ASCERTAINED REQUEST, A COUNT
VALUE ASSOCIATED WITH A COUNTER ASSOCIATED WITH THE
MEMORY ADDRESS RANGE
404

DETERMINE AN AGGREGATED VALUE AS A FUNCTION OF THE COUNT
VALUE ASSOCIATED WITH THE COUNTER AND A PERFORMANCE
VALUE ASSOCIATED WITH A PERFORMANCE ATTRIBUTE OF THE
MEMORY ADDRESS RANGE
406

DETERMINE, BASED ON AN ANALYSIS OF THE AGGREGATED VALUE,
WHETHER USAGE OF THE MEMORY ADDRESS RANGE EXCEEDS A
SPECIFIED USAGE
408

BASED ON A DETERMINATION THAT THE USAGE OF THE MEMORY
ADDRESS RANGE EXCEEDS THE SPECIFIED USAGE, MODIFY THE
USAGE OF THE MEMORY ADDRESS RANGE TO REDUCE CONTENTION
WITH RESPECT TO THE MEMORY ADDRESS RANGE
410

*FIG. 4*

PERFORMANCE COUNTERS FOR COMPUTER MEMORY

PRIORITY

This application is a Continuation of commonly assigned and co-pending U.S. patent application Ser. No. 15/984,219, filed May 18, 2018, which claims priority to U.S. Provisional Application Ser. No. 62/583,909, filed Nov. 9, 2017, the disclosures of which are hereby incorporated by reference in their entireties.

BACKGROUND

A computer system may include various types of computer memory. For example, the computer memory may include volatile memory such as random access memory (RAM) that is used for primary storage in a computer system. Compared to volatile memory, non-volatile memory may be used for secondary storage, or persistent storage. Examples of non-volatile memory include read-only memory, flash memory, magnetic computer storage devices, etc.

The computer memory may be non-uniform in that different tiers of the computer memory may include different values for qualities including latency, throughput, capacity, endurance, and durability. Latency may be described as a delay before a transfer of data or execution of a command begins following an associated instruction for transfer of the data or execution of the command. Throughput may be described as a rate at which data may be read from or stored into the computer memory. Further, endurance may be described as the number of program and/or erase cycles that may be applied to the computer memory before the computer memory becomes unreliable. Durability may be described as an attribute of persistent memory which describes how long data may remain valid in memory with no applied power.

In order to optimize the computer system performance, content in the computer memory may need to be placed in an appropriate tier of the computer memory. For example, certain content may need to be placed in a tier of the computer memory that includes a specified latency, whereas other content may need to be placed in other tiers based on throughput, endurance, and/or other factors. In this regard, it is technically challenging to select a tier of the computer memory in which to place the content so that the selected tier matches the behavior of an application (or another device) that uses that tier. It is also technically challenging to predict the behavior of an application to select an appropriate tier, where an operating system or hypervisor associated with the computer system may utilize the predicted behavior to make decisions about placement of the content in a particular tier. Yet further, it is technically challenging to dynamically modify the placement of the content in a particular tier of the computer memory as the behavior of the different tiers and placement of the content in a particular tier may change over time.

A tier of the computer memory (or a storage location generally) may also be subject to contention from a plurality of sources that access or otherwise utilize the content of that tier. For example, a particular tier may include appropriately placed content. However, due to a relatively large number of accesses to that particular tier, usage of that particular tier may result in reduced performance of the computer system in association with that particular tier. In this regard, it is technically challenging to predict when usage of a particular tier exceeds a specified usage. It is also technically challenging to modify usage of a particular tier to meet a specified usage to increase or otherwise maintain the performance of the computer system at a specified cost, performance, or power consumption level.

Yet further, a tier of the computer memory may be defined to map into a cache by "coloring" where all parts of the tier which are assigned the same color will be competing for the same placement in cache. This competition may reduce performance of the computer memory if two or more separate sets of memory, having the same color, are in frequent use. In this regard, it is technically challenging to statically select colors that avoid this performance reduction because of usage pattern changes over time, and further because of limited knowledge of the planned usage of a region of memory at the time it may be allocated. It is also technically challenging on computer systems to monitor and locate regions where such conflicts are occurring.

BRIEF DESCRIPTION OF DRAWINGS

Features of the present disclosure are illustrated by way of example and not limited in the following figure(s), in which like numerals indicate like elements, in which:

FIG. 4 illustrates a flowchart of a method for performance counters for computer memory in accordance with an embodiment of the present disclosure.

DETAILED DESCRIPTION

Figure 1:
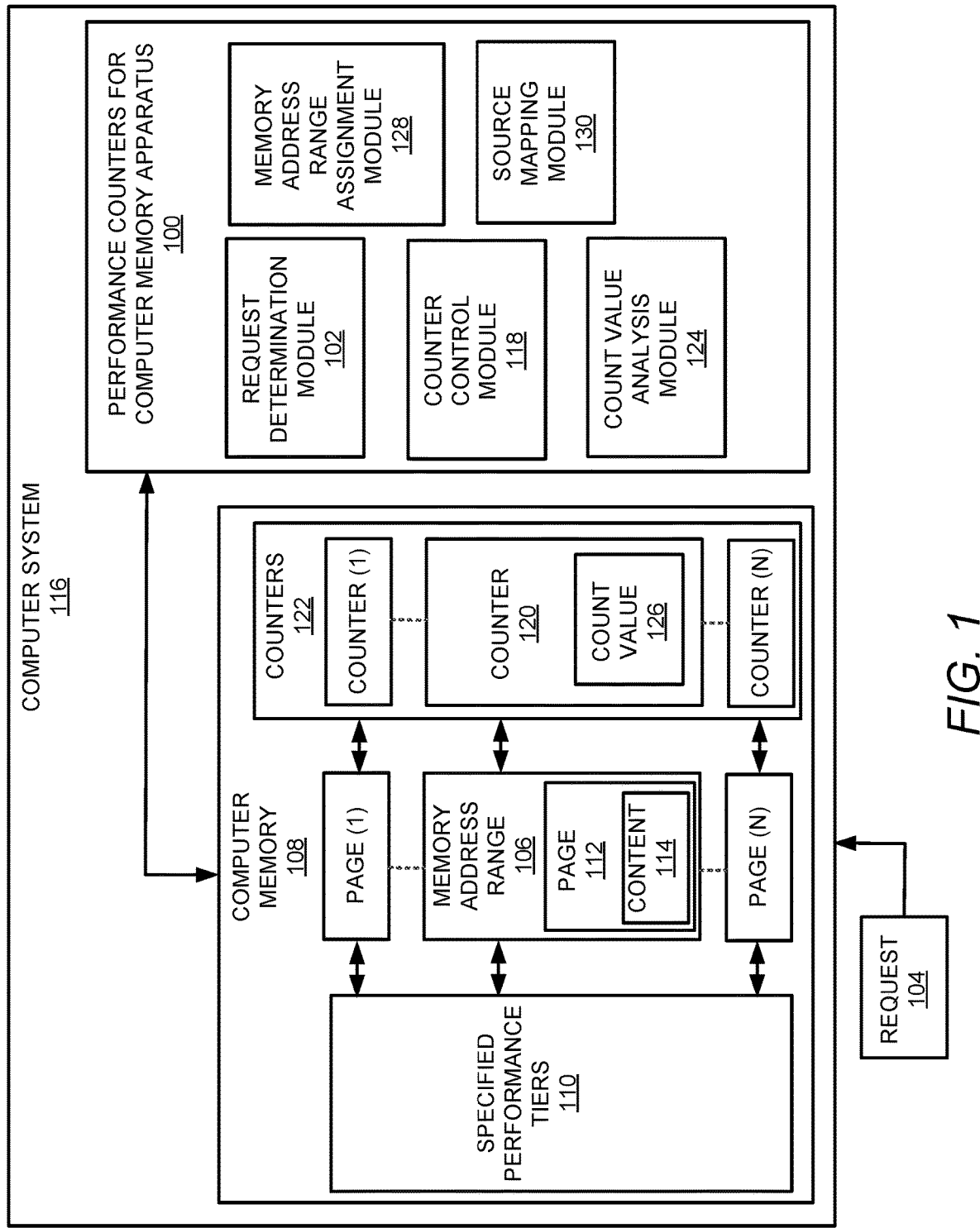
FIG. 1 illustrates a layout of a performance counters for computer memory apparatus in accordance with an embodiment of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Apparatuses for performance counters for computer memory, methods for performance counters for computer memory, and non-transitory computer readable media having stored thereon machine readable instructions to provide performance counters for computer memory are disclosed herein. The apparatuses, methods, and non-transitory computer readable media disclosed herein provide for implementation of counters to memory modules, bulk memory, etc., of the computer memory. The counters may be used to address at least the aforementioned technical challenges by obtaining behavioral data of an application (or another device) to place content in the computer memory in an appropriate tier of the computer memory. The counters may also address at least the aforementioned technical challenges by locating possible extensive contention, which enables other steps to be initiated to reduce that contention. The memory modules may include double data rate (DDR) dual in-line memory modules (DIMMs), etc., and the bulk memory may include read-only memory, flash memory, etc.

Each counter may monitor the activity of a specific range of the computer memory within a computer system. For example, a plurality of counters may be used and include memory ranges that span the entire computer memory of the computer system. Each memory range may correspond to a block of the computer memory which an operating system (OS) or hypervisor may be able to move between different specified performance tiers of the computer memory.

According to examples, the counters may include separate counters for both read activities, and write activities, and other time-consuming activities which do not carry data such as refresh cycles, program cycles, and idle times. Alternatively or additionally, the counters may account for an aggregation of both read activities and write activities. Alternatively or additionally, the counters may include counters for just read activities. Alternatively or additionally, the counters may include counters for just write activities. Alternatively or additionally, the counters may include counters for recording cycle mix and pipelined command activities.

With respect to a number of counters utilized, according to examples, the number of counters may be sufficient for the counting of a sufficient number of regions to allow memory activity within the entire memory footprint of a system to be scanned in a timely manner, or in default for all regions of a standard size which are candidates for movement to have individual counters. Thus, an adequate number of counters may be flexibly assigned to memory regions of interest. For example, counters may be assigned to memory modules of the computer memory for movement of content between different specified performance tiers of the memory modules.

The counters may also include summary counters. In this regard, even though every page may include counters, the summary counters may provide a total count for a DIMM. The summary counters may provide for a determination of whether total activity falls below a threshold for concern.

With respect to counter size, according to examples, the counters may be large enough to capture the full range of counts expected in an interval between inspection of associated count values. Alternatively or additionally, the counters may saturate when a maximum count value is reached. Alternatively or additionally, free running counters may wrap around at full count, back to zero, and the inspection of the associated count values may optionally zero the count values. Alternatively or additionally, saturating counters may be set to zero after count values have been inspected. Alternatively or additionally, saturating counters may indication saturation or overflow conditions. Generally, any type of counter (free running or saturating) may be zeroed after inspection.

With respect to computer system performance, the counters may be used for various performance measurement purposes. For example, in addition to guiding the placement of memory blocks in an appropriate specified performance tier, counters may be used for reducing contention from a plurality of sources that access or otherwise utilize content of a particular tier (or storage location generally). In this regard, the counters may identify contention, which may then be used to trigger other steps to reduce the contention.

The counters as disclosed herein may thus provide for the simultaneous and efficient gathering of information with respect to the intensity of use of actual computer memory. In this regard, the computer memory may be divided into block ranges (such as page ranges supported by central processing unit (CPU) mapping tables), for the guidance of operating system or hypervisor algorithms which make decisions about placement of memory blocks into different non-uniform memory access (NUMA) or specified performance tiers.

The counters as disclosed herein may include attributes such as page size, virtual to physical mapping, the aspect of "hot" pages, loading of the counters by a multiplier based on access latency, and adjustment of the multiplier based on burstiness of READ/WRITE accesses (e.g., an indication of potential queuing delays). A hypervisor may utilize the counters to perform redistribution of virtual-to-physical page mapping based on an aggregate of {Sum (count*latency*burstiness)}. The counters may be analyzed based on a "leaky bucket" or precise count value analysis. In this regard, the precise count value analysis may cause counter overruns. The leaky buckets approach or re-arming of the counters after an overrun may provide a qualitative measure of "hotness" or "cost" of access/operation. The counters may provide for a mapping of "counted bins" into "numbers" that may be stored into registers for subsequent READ (e.g., (normal, 1), (heavy use, 2), (bursty use, 3), . . ., etc.). For the counters, changing a count mode may be based on overrun (e.g., if overrun occurs, then go into Log for example, and zero out the counter on READs).

With respect to counter usage, a hypervisor may read the contents of all counters (e.g., counters up to 100 k, or more) and sort the count values. For example, the hypervisor may identify the lowest and the highest count values. In this regard, indications of the highest counts may signify pages with the heaviest use. A caching system may identify hottest pages, for example, by using physical memory address and virtual address (PA,VA) mapping, move contenders to "faster" more expensive memory, and move coldest pages to relatively "slower" bulk memory. In dual-socket servers, virtual machines may be on either central processing unit (CPU). Further, the virtual machines may be moved (e.g., distributed) to different CPUs based on the "hotness" of memory (e.g., determined via the counters). The counters may be used for re-balancing virtual machines or pages allocated to each virtual machine based on a "hotness" criteria to redistribute DIMM power (e.g., less computer system power may equate to increased memory reliability).

According to examples, the apparatuses, methods, and non-transitory computer readable media disclosed herein may include a computer system including a processing element including a memory interface and a memory sub-system. The memory sub-system may include a memory buffer/controller (e.g., interface to the host memory controller). The memory sub-system may include intelligent counters to count events (e.g., READ cycles, WRITE cycles, refresh cycles, pipelined cycles, etc.). The intelligent counters may include a plurality of counters (e.g., based on memory capacity, and page size). The page size may be based on a judicious choice based on granularity of a measurement, virtual machine needs, etc. The intelligent counters may provide for accumulating counts and processing. The unit of measurement and scale for the intelligent counters may be quantitative and qualitative. A quantitative unit of measurement may include a linear scale, binned scale, log scale after saturation/overflow, saturated bucket, leaky bucket, sliding window, etc. The qualitative unit of measurement may include a heatmap, etc. The intelligent counters may include a weighted sum determined as a function of (Media Latency)*(access frequency)*(Burstiness). In this regard, the counters may be loaded by a "fixed" multiplier based on access latency. According to another example, the counters may be loaded by a "calculated" multiplier based on "burstiness" of cycles (e.g., pipelined cycles predict queuing delays). The intelligent counters may provide an indication of bus utilization, throughput, and efficiency (e.g., data movement, idle, refresh, turn-around cycles, etc.). Further, the intelligent counters may provide a determination of "hot" memory pages (e.g., to provide a method for the buffer/controller to "paint" a "heatmap", and the ability for the intelligent buffer to develop the "heatmap"). The memory sub-system may further include a memory medium (e.g., memory device). The memory medium may include different memory types (e.g., different latency and different capacities).

According to examples, for the apparatuses, methods, and non-transitory computer readable media disclosed herein, the computer system may further include a hypervisor, for example, to manage virtual machines. In this regard, the hypervisor may provide for judicious, dynamic mapping of virtual address (VA) to physical memory address (PA) for each virtual machine. The hypervisor may provide an indication of "hot" pages (based on sampling of the intelligent counters). The hypervisor may provide for the development of a "heatmap" as disclosed herein. The hypervisor may provide for redistribution based on observed memory traffic (e.g., reading/sampling of the intelligent counter registers). The hypervisor may provide for optimization for memory access latency, power consumption, and overall memory subsystem cost. The hypervisor may provide for redistribution of virtual machines versus redistribution of pages used by each virtual machine. Further, the hypervisor may provide for redistribution of virtual machines to different CPUs and memory media type.

For the apparatuses, methods, and non-transitory computer readable media disclosed herein, modules, as described herein, may be any combination of hardware and programming to implement the functionalities of the respective modules. In some examples described herein, the combinations of hardware and programming may be implemented in a number of different ways. For example, the programming for the modules may be processor-executable instructions stored on a non-transitory machine-readable storage medium and the hardware for the modules may include a processing resource to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

FIG. 1 illustrates a layout of an apparatus for performance counters for computer memory (hereinafter also referred to as "apparatus 100") according to an embodiment of the present disclosure.

Referring to FIG. 1, the apparatus 100 may include a request determination module 102 to ascertain a request 104 associated with a memory address range 106 of computer memory 108. The memory address range 106 may be assigned to a specified performance tier of a plurality of specified performance tiers 110. For example, the specified performance tiers may include different types of specified performance based on factors such as latency, throughput, endurance, etc. The memory address range 106 may correspond to a page 112 in the computer memory 108, where the page 112 includes content 114 that is accessed by the request 104. As shown in FIG. 1, pages (1) to (N) may each be assigned to a specified performance tier of the plurality of specified performance tiers 110. The computer memory 108 may include volatile memory such as RAM, non-volatile memory such as read-only memory, flash memory, magnetic computer storage devices, etc. The computer memory 108 may be provided on a computer system 116.

A counter control module 118 may ascertain a performance value associated with a performance attribute of the memory address range 106. For example, the performance attribute may include latency, burstiness, dispersity of read and write request cycles, etc., associated with the memory address range 106. The counter control module 118 may determine, based on the ascertained performance value, a weight value. Further, the counter control module 118 may increment, based on the ascertained request 104 and the determined weight value, a count value associated with a counter 120 associated with the memory address range. In this regard, the computer memory 108 may include a plurality of counters 122. As shown in FIG. 1, pages (1) to (N) may each be assigned to corresponding counters (1) to (N) of the counters 122.

A count value analysis module 124 may determine, based on an analysis of the count value 126 associated with the counter 120, whether the memory address range 106 is to be assigned to a different specified performance tier of the plurality of specified performance tiers 110.

Based on a determination that the memory address range 106 is to be assigned to the different specified performance tier, a memory address range assignment module 128 may assign the memory address range 106 to the different specified performance tier.

Alternatively or additionally, the count value analysis module 124 may determine, based on an analysis of the count value 126 associated with the counter 120, whether the usage, for example, due to contention, of the memory address range 106 exceeds a specified usage. In this regard, the memory address range assignment module 128 may modify usage of the memory address range 106 to reduce contention with respect to the memory address range 106, balance machine resources of a computer system that includes the computer memory, or otherwise improve performance with respect to the memory address range. In this regard, the resources may include bandwidth, power, etc.

With respect to contention, as disclosed in further detail herein, assuming that the DRAM (not shown) of the computer system 116 is being used as a cache for another memory system (e.g., a DDR DIMM), there may be multiple sources mapped into a target memory region of the cache. In this regard, the count value analysis module 124 may determine whether mapping of the multiple sources into the target memory region of the cache is acceptable, or whether the mapping should be changed by comparing the count value 126 for a particular physical memory to a specified threshold. In this regard, the physical memory may represent a cache associated with the count value 126. Based on a determination that the count value 126 for the particular physical memory exceeds the specified threshold, a source mapping module 130 may change the mapping of a source (or a plurality of sources) to a different physical memory to be used as the cache for the re-mapped source. In this manner, contention with respect to the originally mapped physical memory may be reduced.

Figure 2:
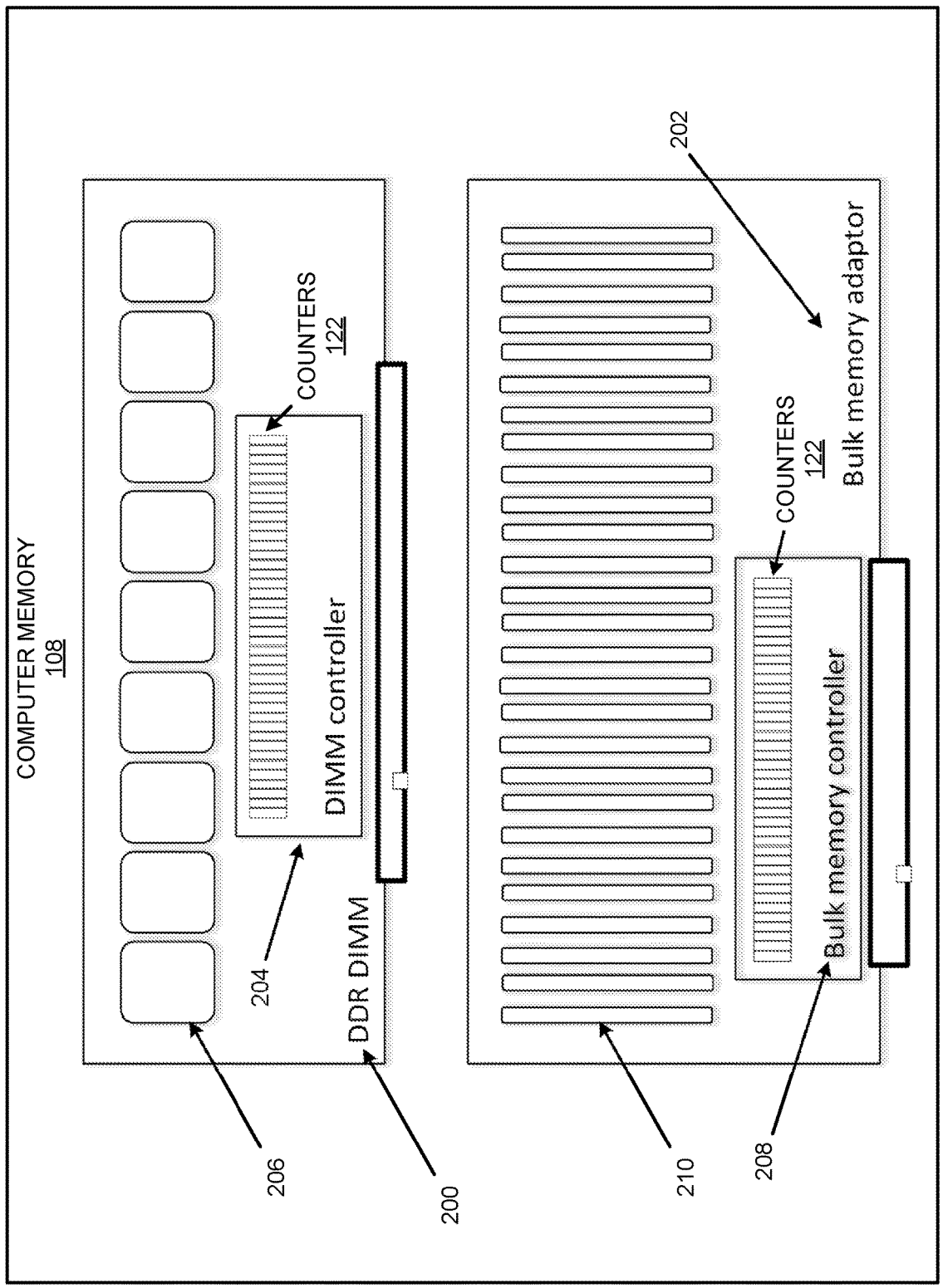
FIG. 2 illustrates an example of a layout including counters for measuring computer memory usage for the performance counters for computer memory apparatus of FIG. 1 in accordance with an embodiment of the present disclosure.

FIG. 2 illustrates an example of a layout including counters for measuring computer memory usage for the apparatus 100 in accordance with an embodiment of the present disclosure.

Referring to FIG. 2, according to examples, the counters 122 may be added to the DIMMs (e.g., the DDR DIMM 200) and the bulk memory 202. For the example of FIG. 2, the DDR DIMM 200 may include a DIMM controller 204 and dynamic random-access memory (DRAM) packages 206. Further, the bulk memory 202 may include a bulk memory controller 208, and bulk memory packages 210.

For the example of FIG. 2, each page 112 may include a counter 120 for the number of read operations, another counter 120 separately for the number of write operations, and other counters for counting the number of clocks/cycles associated with non-data-carrying cycles such as idle cycles, turn-around cycles, and refresh cycles. Each counter 120 may cover a memory range of the computer memory 108 matching the size of page 112 which a hypervisor may manage. For example, for an x64 compatible computer system, the size of page 112 may be 2 MiB. According to another example, for an ARM-64 computer system, the size of page 112 may be 1 MiB. The size of the page 112 may be similarly determined for other types of computer systems. Pages of different sizes may be accommodated, for example, by adding counter values. For example, for the x64 compatible computer system and the ARM-64 computer system, the memory range may be standardized on 1 MiB to thus add pairs of counter values for the x64 compatible computer system. Thus, a DIMM with 16 GiB of memory may include 16,384 read and 16,384 write counters.

According to examples, the counters 122 may be 8-bit counters that saturate at 255, and are zeroed before sampling again. In this regard, a snapshot mode which copies the counter values into separate static memory may be used, and then the counters may be zeroed.

According to examples, the counters 122 may be sampled without a snapshot. In this regard, the counters may be sampled on a steady cadence which provides approximately the same interval between reading of the count values for each counter.

For the example of FIG. 2, with respect to the pages (1) to (N) of FIG. 1, the OS or hypervisor may use the count values to locate "hot pages" in the bulk memory 202 or "cold pages" in the DIMMs (e.g., the DDR DIMM 200). The hot pages from the bulk memory 202 may be moved to the DIMMs. Similarly, the cold pages in the DIMMs may be moved to the bulk memory 202.

"Hot pages" may refer pages for which the count value 126 for the associated memory address range 106 exceeds a specified threshold. Alternatively, a threshold may be set where a page may not be considered hot, even if the page has dropped the most activity in the computer system 116 (since the computer system may be idle). "Cold pages" may refer pages for which the count value 126 for the associated memory address range 106 is below a specified threshold.

As disclosed herein with respect to FIG. 1, the count value analysis module 124 may determine, based on an analysis of the count value 126 associated with the counter 120, whether the memory address range 106 is to be assigned to a different specified performance tier of the plurality of specified performance tiers 110. Further, based on a determination that the memory address range 106 is to be assigned to the different specified performance tier, the memory address range assignment module 128 may assign the memory address range 106 to the different specified performance tier. In this regard, the memory address range assignment module 128 may effectively move the location of the "hot pages" and the "cold pages". That is, the memory address range assignment module 128 may effectively re-map where a particular page is located based on a determination of whether the page is a "hot page" or a "cold page".

As disclosed herein with respect to FIG. 1, the count value analysis module 124 may determine, based on an analysis of the count value 126 associated with the counter 120, whether the memory address range 106 is to be assigned to a different specified performance tier of the plurality of specified performance tiers 110. In this regard, the count value 126 may be analyzed with or without the inclusion of weighting factors.

For example, the count value 126 may be analyzed without the inclusion of weighting factors by incrementing the count value 126 in direct proportion to a number of requests (e.g., each request 104) associated with the memory address range 106 of computer memory 108.

Alternatively or additionally, the count value 126 may be analyzed with the inclusion of weighting factors by applying a function that accounts for different aspects of the request 104 associated with the memory address range 106 of computer memory 108. For example, the weighting factor may be determined as a product of latency and access frequency. For example, the latency associated with a specified performance tier may be fixed. However, if the latency associated with a specified performance tier changes (e.g., is increased from 100 nanosecond (ns) to 300 ns), then the associated count value may be increased by a corresponding weight (e.g., by a weight of three for the increase from 100 ns to 300 ns) to indicate the utilization of the associated memory region. Alternatively or additionally, the latency associated with a specified performance tier may change, for example, due to queuing of requests. The counters may infer such queuing delay by tracking read/write cycle mix, cycle sequence, and command pipeline intensity.

Alternatively or additionally, the count value 126 may be analyzed with the inclusion of weighting factors by accounting for how bursty activities related to the requests are. For example, a memory controller may identify the dispersity of request cycles coming to the associated memory module (e.g., read followed by write, successive reads, etc.), which may indicate queuing at the memory controller. In this regard, a count value may be assigned a weight according to the module's estimate of the cost of the operation (e.g., how bursty the activity is).

As disclosed herein with respect to FIG. 1, the counter control module 118 may increment, based on the ascertained request 104, the counter 120 associated with the memory address range. Further, the count value analysis module 124 may determine, based on an analysis of the count value 126 associated with the counter 120, whether the memory address range 106 is to be assigned to a different specified performance tier of the plurality of specified performance tiers 110. In this regard, the count value 126 may be based on an increment per ascertained request 104. Alternatively or additionally, the count value 126 may be determined based on a "leaky bucket" approach. For the "leaky bucket" approach, the count value may be incremented per ascertained request 104, but for every specified time period (e.g., millisecond or number of clocks), a specified amount (e.g., $1/10^{th}$, $1/4^{th}$, or $1/3^{rd}$) of the total current count values for the counter may be subtracted from the total current count values. In this manner, the count value 126 analyzed by the count value analysis module 124 may represent relatively recent activity with respect to the associated counter, and older activity may be therefore discounted. The removal of the specified amount of the total current count values may represent assignment of a decay (e.g., an exponential decay) to the count values.

Alternatively or additionally, with respect to operation of the count value analysis module 124, if a count value 126 has not been analyzed by the count value analysis module 124 for a specified time period (e.g., 120 seconds), then the counter may be cleared, and the count values for a specified time duration (e.g., within 120 seconds) may be analyzed.

Alternatively or additionally, with respect to operation of the count value analysis module 124, a DRAM may predominately include reads/writes of one size (e.g., cache line size). However, depending on whether a read or a write is short or long, different costs (e.g., weights) may be assigned to the count values.

Once the count values are analyzed by the count value analysis module 124, the count values for the associated counter may be set to zero. For example, once the count values are read by the count value analysis module 124, the count values may be set to zero.

With respect to counter overrun, when a counter reaches a maximum count value, the counter may proceed to binning, which may be in the form of a log function. In this regard, each subsequent count increment may be weighted by a function that incrementally or otherwise non-incrementally increases the count value weight. For example, with respect to incremental increase, once a counter reaches a maximum count value, the next count value may be weighted by a factor of 5, the following count value may be weighted by a factor of 10, etc. With respect to a non-incremental increase, once a counter reaches a maximum count value, the next count value may be weighted by a factor of 5, the following count value may be weighted by a factor of 20, etc. Alternatively or additionally, when one counter reaches overflow condition, all counters in the same group may start using the new weight factor. This condition will be indicated in a weight factor register for that group of counters. Alternatively or additionally, an overflow condition in one counter may cause all counters in the same group to shift-right their bit values (e.g., divide their content by 2). This shift-right condition may be indicated in the weight factor register (or a division factor register).

With respect to contention, as disclosed herein with reference to FIG. 1, the count value analysis module 124 may determine, based on an analysis of the count value 126 associated with the counter 120, whether the usage, for example, due to contention, of the memory address range 106 exceeds a specified usage. In this regard, the memory address range assignment module 128 may modify usage of the memory address range 106 to reduce contention with respect to the memory address range 106. For example, assuming that the DRAM (not shown) of the computer system 116 is being used as a cache for another memory system (e.g., the DDR DIMM 200), there may be multiple sources mapped into the target memory region of the cache. For example, multiple virtual addresses may be mapped to one physical memory with respect to the DRAM. Generally, multiple parts of the memory address space may be set to use the physical memory as the cache. In this example, mapping of the multiple virtual addresses to the physical memory may be evaluated by the count value analysis module 124 to determine whether the mapping is acceptable, or whether the mapping should be changed.

For the example where multiple parts of the memory address space may use the physical memory as a cache, there may be situations where two or more of the memory address space parts are relatively heavily using the cache. This relatively heavy use may result in contention, which may reduce performance of the computer system 116, for example, because of wastage of time during changing of the physical memory that is used as the cache.

According to examples, the count value analysis module 124 may determine whether the mapping is acceptable, or whether the mapping should be changed by comparing the count value 126 for the particular physical memory to a specified threshold. Based on a determination that the count value 126 for the particular physical memory exceeds the specified threshold, the source mapping module 130 may change the mapping of a source (or a plurality of sources) to a different physical memory to be used as the cache for the re-mapped source. In this manner, contention with respect to the originally mapped physical memory may be reduced. If the contention is not reduced after changing of the mapping of the source to the different physical memory, the mapping of another source (or a plurality of other sources) may be changed to a different physical memory until contention is satisfactorily reduced.

As disclosed herein, "hot pages" may refer pages for which a number of count values exceed a specified threshold. In this regard, there may be multiple sources that may be using the same region of memory as a cache, and thus contention may arise if there are different sources that have highly used pages (e.g., hot pages) that should be put in a cache, and thus the multiple sources may attempt to use the same cache space.

If the level of activity on the hottest page is reduced, activity with respect to other pages may be balanced to a more uniform level. In this regard, even with some contention occurring, the overall contention level may be reduced by changing the mapping of the source to the different physical memory. Thus, the physical assets of the computer system 116 may be redistributed based on the remapping of the logical to physical definitions.

With respect to usage of the counters 122, when a hypervisor reads the counters 122, there may be up to 100's or thousands of the counters 122. The hypervisor may sort the counters 122 based on count values and identify either the largest or the smallest count values. For the smallest count values, for caching and contention as disclosed herein, the smallest count values may be identified as destinations for remapping to a less heavily used location. With respect to multiple specified performance tiers, the smallest count values may represent candidates for demotion for moving to a lower specified performance tier. With respect to the highest count values, for caching and contention as disclosed herein, for the hottest pages, one of the multiple contenders may be moved to a larger page. For multiple specified performance tiers, the hottest pages in the lowest performance tiers may be moved to higher specified performance tiers.

For the highest count values, the count values may be read at a specified frequency that is likely to identify pages with the highest count values. For example, if the counters 122 saturate, then the specified frequency may be reduced so that none or very few of the counters saturate to thus provide an indication of which pages are receiving the heaviest use.

With respect to other applications of the counters 122, assuming that a server includes two sockets, and virtual machines are assigned to either socket, there may be several virtual machines in the server and those virtual machines may include different levels of activity. If some of the most heavily active virtual machines are assigned to one socket, performance of the computer system 116 may be increased by moving one of the virtual machines to another socket so that the computer system 116 is balanced with respect to system resources. Thus, the counters 122 may function as memory activity counters to estimate other types of activity such as CPU usage, and re-balancing of the computer system 116 by moving devices in order to attain a higher probability of balance amongst system resources. In this regard, activity of a virtual machine may be determined by adding the count values with respect to pages belonging to specific virtual machines.

With respect to other applications of the counters 122, activity on a memory bus may translate into power consumption. In this regard, the redistribution of resources may be based on power consumption. For example, high count values of buffers may provide an indication of power consumption. The high count values may be used to detect a particular DIMM that is overheated. For example, if there are multiple DIMMs on a given specified performance tier, and the overheated DIMM is accessing pages, activities with respect to the overheated DIMM may be re-assigned to the other DIMMs to balance the load, and thus balance the power consumption associated with the computer system 116.

Figure 3:
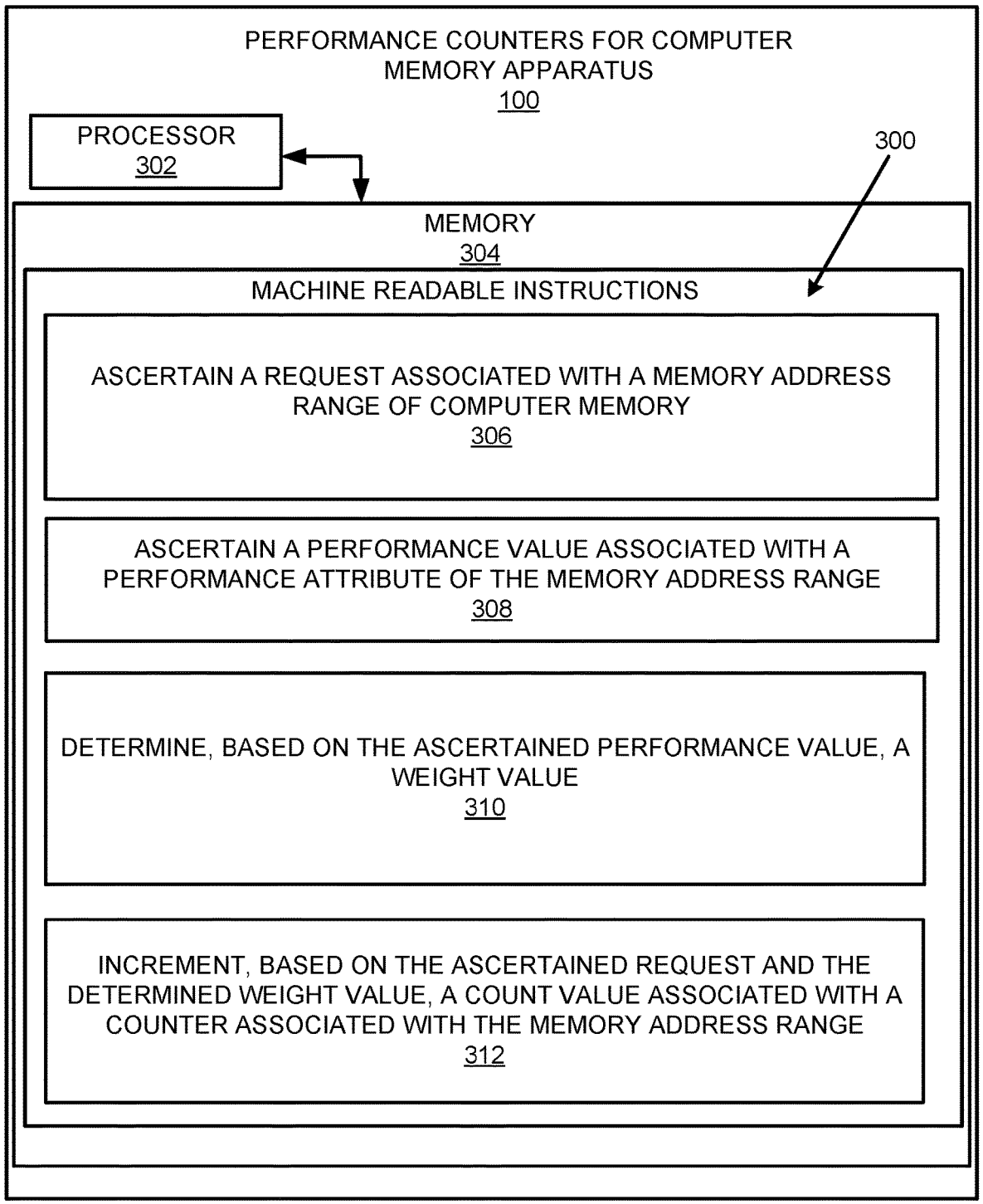
FIG. 3 illustrates a block diagram for performance counters for computer memory in accordance with an embodiment of the present disclosure.
Figure 3:
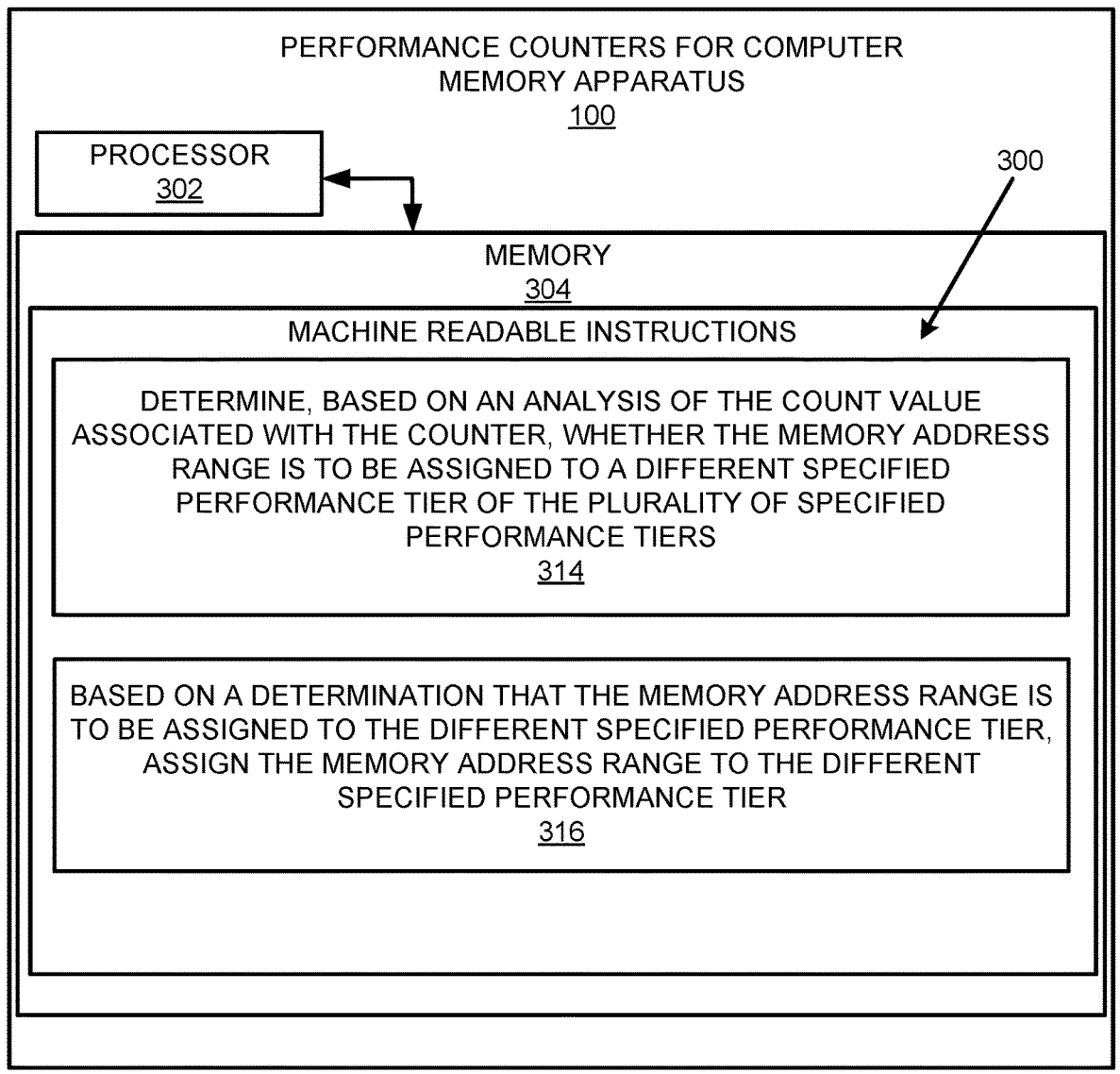
Figure 5:
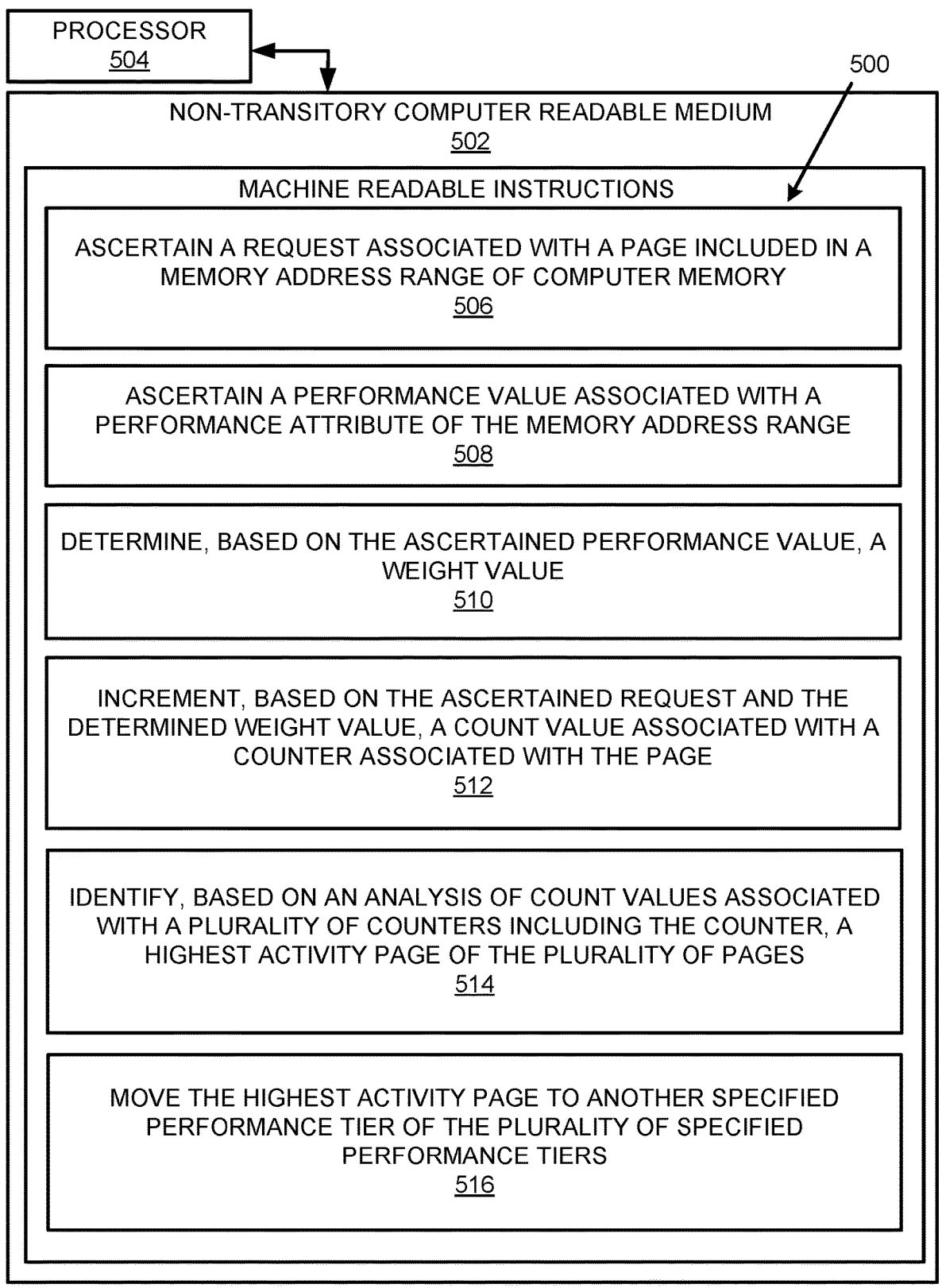
FIG. 5 illustrates a block diagram for performance counters for computer memory in accordance with another embodiment of the present disclosure.

FIGS. 3-5 respectively illustrate an example block diagram 300, a flowchart of an example method 400, and a further example block diagram 500 for performance counters for computer memory, according to examples. The block diagram 300, the method 400, and the block diagram 500 may be implemented on the apparatus 100 described above with reference to FIG. 1 by way of example and not of limitation. The block diagram 300, the method 400, and the block diagram 500 may be practiced in other apparatus. In addition to showing the block diagram 300, FIG. 3 shows hardware of the apparatus 100 that may execute the instructions of the block diagram 300. The hardware may include a processor 302, and a memory 304 storing machine readable instructions that when executed by the processor cause the processor to perform the instructions of the block diagram 300. The memory 304 may represent a non-transitory computer readable medium. FIG. 4 may represent an example method for performance counters for computer memory, and the steps of the method. FIG. 5 may represent a non-transitory computer readable medium 502 having stored thereon machine readable instructions to provide performance counters for computer memory according to an example. The machine readable instructions, when executed, cause a processor 504 to perform the instructions of the block diagram 500 also shown in FIG. 5.

The processor 302 of FIG. 3 and/or the processor 504 of FIG. 5 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 502 of FIG. 5), such as hardware storage devices (e.g., RAM (random access memory), ROM (read only memory), EPROM (erasable, programmable ROM), EEPROM (electrically erasable, programmable ROM), hard drives, and flash memory). The memory 304 may include a RAM, where the machine readable instructions and data for a processor may reside during runtime.

Referring to FIGS. 1-3, and particularly to the block diagram 300 shown in FIG. 3, the memory 304 may include instructions 306 to ascertain a request 104 associated with a memory address range 106 of computer memory. The memory address range 106 may be assigned to a specified performance tier of a plurality of specified performance tiers 110.

The processor 302 may fetch, decode, and execute the instructions 308 to ascertain a performance value associated with a performance attribute of the memory address range 106.

The processor 302 may fetch, decode, and execute the instructions 310 to determine, based on the ascertained performance value, a weight value.

The processor 302 may fetch, decode, and execute the instructions 312 to increment, based on the ascertained request 104 and the determined weight value, a count value 126 associated with a counter 120 associated with the memory address range 106.

The processor 302 may fetch, decode, and execute the instructions 314 to determine, based on an analysis of the count value 126 associated with the counter 120, whether the memory address range 106 is to be assigned to a different specified performance tier of the plurality of specified performance tiers 110.

Based on a determination that the memory address range 106 is to be assigned to the different specified performance tier, the processor 302 may fetch, decode, and execute the instructions 316 to assign the memory address range 106 to the different specified performance tier.

According to examples disclosed herein, the performance attribute may include a latency associated with the memory address range 106. In this regard, the latency value associated with the latency attribute of the memory address range 106 may be ascertained, and based on the ascertained latency value, the weight value may be determined.

According to examples disclosed herein, the performance attribute may include an intermittent increase or decrease (e.g., burstiness) in requests associated with the memory address range 106. In this regard, the intermittent increase or decrease in requests value associated with the intermittent increase or decrease in requests attribute of the memory address range 106 may be ascertained, and based on the ascertained intermittent increase or decrease in requests value, the weight value may be determined.

According to examples disclosed herein, the performance attribute may include a dispersity of read and write request cycles associated with the memory address range 106. The read and write request cycles may include a read followed by a write, a write followed by a read, successive reads, and/or successive writes. In this regard, the dispersity of read and write request cycles value associated with the dispersity of read and write request cycles attribute of the memory address range 106 may be ascertained, and based on the ascertained dispersity of read and write request cycles value, the weight value may be determined.

According to examples disclosed herein, based on the ascertained performance value, the weight value may be determined by proportionally increasing or decreasing a base weight value according to an increase or decrease in the performance value from a base performance value (e.g., as disclosed herein with respect to the increase from 100 nanosecond (ns) to 300 ns, etc.). A count value 126 increment increase or decrease may be determined by multiplying the determined weight value and a base count value 126 increment associated with the counter 120 associated with the memory address range 106. Based on the ascertained request 104, the count value 126 may be incremented by the determined count value 126 increment increase or decrease.

According to examples disclosed herein, the count value 126 associated with the counter 120 may be determined. A determination may be made as to whether a specified time period has elapsed since the determination of the count value 126 associated with the counter 120. Based on a determination that the specified time period has elapsed since the determination of the count value 126 associated with the counter 120, the count value 126 may be reduced by a specified amount (e.g., as disclosed herein with respect to the "leaky bucket" approach).

According to examples disclosed herein, the count value 126 associated with the counter 120 may be determined for a specified time duration (e.g., 120 seconds) that is less than an overall time duration of all count values associated with the counter 120. Based on the ascertained request 104 and the determined weight value, the determined count value 126 associated with the counter 120 associated with the memory address range 106 may be incremented.

According to examples disclosed herein, a determination may be made as to whether the request 104 includes a relatively short read, a relatively short write, a relatively long read, or a relatively long write. Based on the ascertained performance value and the determination of whether the request 104 includes the relatively short read, the relatively short write, the relatively long read, or the relatively long write, the weight value may be determined.

According to examples disclosed herein, a determination may be made as to whether the count value 126 is equal to a maximum count value 126. Based on a determination that the count value 126 is equal to the maximum count value 126, the weight value may be determined to incrementally increase count values subsequent to the maximum count value 126.

According to examples disclosed herein, a determination may be made as to whether the count value 126 is equal to a maximum count value 126. Based on a determination that the count value 126 is equal to the maximum count value 126, the weight value may be determined to non-incrementally increase count values subsequent to the maximum count value 126.

Referring to FIGS. 1-2 and 4, and particularly FIG. 4, for the method 400, at block 402, the method may include ascertaining a request 104 associated with a memory address range 106 of computer memory.

At block 404, the method may include incrementing, based on the ascertained request 104, a count value 126 associated with a counter 120 associated with the memory address range 106.

At block 406, the method may include determining an aggregated value as a function of the count value 126 associated with the counter 120 and a performance value associated with a performance attribute of the memory address range 106.

At block 408, the method may include determining, based on an analysis of the aggregated value, whether usage of the memory address range 106 exceeds a specified usage At block 410, based on a determination that the usage of the memory address range 106 exceeds the specified usage, the method may include modifying the usage of the memory address range 106 to reduce contention with respect to the memory address range 106. For example, based on a determination that usage of the memory address range 106 exceeds the specified usage, the method may include modifying the usage of the memory address range 106 to reduce contention with respect to the memory address range 106, balancing machine resources of a computer system 116 that includes the computer memory, or otherwise improving performance with respect to the memory address range 106. In this regard, the resources may include bandwidth, power, etc.

Referring to FIGS. 1-2 and 5, and particularly FIG. 5, for the block diagram 500, the non-transitory computer readable medium 502 may include instructions 506 to ascertain a request 104 associated with a page 112 included in a memory address range 106 of computer memory. According to examples, the computer memory may include a plurality of pages including the page 112.

The processor 504 may fetch, decode, and execute the instructions 508 to ascertain a performance value associated with a performance attribute of the memory address range 106.

The processor 504 may fetch, decode, and execute the instructions 510 to determine, based on the ascertained performance value, a weight value.

The processor 504 may fetch, decode, and execute the instructions 512 to increment, based on the ascertained request 104 and the determined weight value, a count value 126 associated with a counter 120 associated with the page 112.

The processor 504 may fetch, decode, and execute the instructions 514 to identify, based on an analysis of count values associated with a plurality of counters including the counter 120, a highest activity page 112 of the plurality of pages. In this regard, the highest activity page 112 may be assigned to a specified performance tier of a plurality of specified performance tiers 110.

The processor 504 may fetch, decode, and execute the instructions 516 to move the highest activity page 112 to another specified performance tier of the plurality of specified performance tiers 110.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
   a processor, and
   a memory storing machine readable instructions that when executed by the processor cause the processor to:
   increment, based on a calculated count value increment that is determined as a function of an attribute of a memory address range, a count value associated with a counter associated with the memory address range;
   determine, based on an analysis of the count value, whether the memory address range is to be assigned to a different type of computer memory; and
   based on a determination that the memory address range is to be assigned to a different type of computer memory, assign the memory address range to the different type of computer memory.

2. The apparatus according to claim 1, wherein the attribute includes a latency associated with the memory address range.

3. The apparatus according to claim 1, wherein the attribute includes an intermittent increase or decrease in requests associated with the memory address range.

4. The apparatus according to claim 1, wherein the attribute includes a dispersity of read and write request cycles associated with the memory address range.

5. The apparatus according to claim 1, wherein the machine readable instructions to increment, based on the calculated count value increment that is determined as the function of the attribute of the memory address range, the count value associated with the counter associated with the memory address range, when executed by the processor further cause the processor to:
   determine, based on an ascertained performance value associated with the memory address range, a weight value by proportionally increasing or decreasing a base weight value according to an increase or decrease in the performance value from a base performance value;
   determine a count value increment increase or decrease by multiplying the determined weight value and a base count value increment associated with the counter associated with the memory address range; and
   increment the count value by the determined count value increment increase or decrease.

6. The apparatus according to claim 1, wherein the machine readable instructions, when executed by the processor further cause the processor to:
   determine the count value associated with the counter;
   determine whether a specified time period has elapsed since the determination of the count value associated with the counter; and
   based on a determination that the specified time period has elapsed since the determination of the count value associated with the counter, reduce the count value by a specified amount.

7. The apparatus according to claim 1, wherein the machine readable instructions, when executed by the processor further cause the processor to:
   determine the count value associated with the counter for a specified time duration that is less than an overall time duration of all count values associated with the counter.

8. The apparatus according to claim 1, wherein the machine readable instructions, when executed by the processor further cause the processor to:
   determine whether a request associated with the memory address range includes a relatively short read, a relatively short write, a relatively long read, or a relatively long write, and
   calculate, based on the determination of whether the request includes the relatively short read, the relatively short write, the relatively long read, or the relatively long write, the count value increment.

9. The apparatus according to claim 1, wherein the machine readable instructions, when executed by the processor further cause the processor to:
   determine whether the count value is equal to a maximum count value; and
   based on a determination that the count value is equal to the maximum count value, determine a weight value to incrementally increase count values subsequent to the maximum count value.

10. The apparatus according to claim 1, wherein the machine readable instructions, when executed by the processor further cause the processor to:
    determine whether the count value is equal to a maximum count value; and
    based on a determination that the count value is equal to the maximum count value, determine a weight value to non-incrementally increase count values subsequent to the maximum count value.

11. A computer implemented method comprising:
    incrementing, by at least one processor and based on a calculated count value increment that is determined as a function of an attribute of a memory address range, a count value associated with a counter associated with the memory address range;
    determining, by the at least one processor and based on an analysis of the count value, whether usage of the memory address range exceeds a specified usage; and
    based on a determination that the usage of the memory address range exceeds the specified usage, modifying, by the at least one processor, the usage of the memory address range to reduce contention with respect to the memory address range.

12. The computer implemented method according to claim 11, wherein the attribute includes a latency associated with the memory address range.

13. The computer implemented method according to claim 11, wherein the attribute includes an intermittent increase or decrease in requests associated with the memory address range.

14. The computer implemented method according to claim 11, wherein the attribute includes a dispersity of read and write request cycles associated with the memory address range.

15. The computer implemented method according to claim 11, further comprising:
    determining the count value associated with the counter;
    determining whether a specified time period has elapsed since the determination of the count value associated with the counter; and
    based on a determination that the specified time period has elapsed since the determination of the count value associated with the counter, reducing the count value by a specified amount.

16. A non-transitory computer readable medium having stored thereon machine readable instructions, the machine readable instructions, when executed by a processor, cause the processor to:
    increment, based on a calculated count value increment that is determined as a function of an attribute of a memory address range of computer memory, a count value associated with a counter associated with the memory address range, wherein the memory address range includes a page of a plurality of pages included in the computer memory;
    identify, based on an analysis of count values associated with a plurality of counters including the counter, a highest activity page of the plurality of pages, wherein the highest activity page is assigned to a specified performance tier of a plurality of specified performance tiers; and
    move the highest activity page to another specified performance tier of the plurality of specified performance tiers.

17. The non-transitory computer readable medium according to claim 16, wherein the machine readable instructions to increment, based on the calculated count value increment that is determined as the function of the attribute of the memory address range of computer memory, the count value associated with the counter associated with the memory address range, when executed by the processor, further cause the processor to:
    determine, based on an ascertained performance value associated with the memory address range, a weight value by proportionally increasing or decreasing a base weight value according to an increase or decrease in the performance value from a base performance value;
    determine a count value increment increase or decrease by multiplying the determined weight value and a base count value increment associated with the counter associated with the memory address range; and increment the count value by the determined count value increment increase or decrease.

18. The non-transitory computer readable medium according to claim 16, wherein the machine readable instructions, when executed by the processor, further cause the processor to:

determine the count value associated with the counter;

determine whether a specified time period has elapsed since the determination of the count value associated with the counter; and based on a determination that the specified time period has elapsed since the determination of the count value associated with the counter, reduce the count value by a specified amount.

19. The non-transitory computer readable medium according to claim 16, wherein the machine readable instructions, when executed by the processor, further cause the processor to:

determine the count value associated with the counter for a specified time duration that is less than an overall time duration of all count values associated with the counter.

20. The non-transitory computer readable medium according to claim 16, wherein the machine readable instructions, when executed by the processor, further cause the processor to:

determine whether a request associated with the memory address range includes a relatively short read, a relatively short write, a relatively long read, or a relatively long write; and calculate, based on the determination of whether the request includes the relatively short read, the relatively short write, the relatively long read, or the relatively long write, the count value increment.

\* \* \* \* \*